United States Patent

[11] 3,565,098

[72] Inventors Frank Welty
4962 Lockwood Blvd.;
Raymond D. Welty, 4307 Lake Road,
Youngstown, Ohio 44511
[21] Appl. No. 775,846
[22] Filed Nov. 14, 1968
[45] Patented Feb. 23, 1971

[54] PRESSURE VISCOSITY COMPENSATING FLOW CONTROL DEVICE
9 Claims, 3 Drawing Figs.
[52] U.S. Cl. ................................................. 137/240,
137/495, 137/501, 137/614.21
[51] Int. Cl. ....................................................... G05d 7/01
[50] Field of Search ............................................ 137/501,
495, 500, 614.21, 240

[56] References Cited
UNITED STATES PATENTS
1,743,127  1/1930  Fuller ............................ 137/495
2,637,339  5/1953  Pease ............................ 137/501
FOREIGN PATENTS
1,077,937  11/1952  Germany ....................... 137/501

Primary Examiner—M. Cary Nelson
Assistant Examiner—R. B. Rothman
Attorney—Webster B. Harpman ABSTRACT: A flow control device responsive in operation to variations in pressure and viscosity of the fluid flowing therethrough utilizes a flexible diaphragm having a pressure drop orifice therein movably mounting a spool and valve element which is also biased by an adjustable tensioning means. Differential pressures on the opposite sides of the flexible diaphragm occasioned by the pressure drop orifice therein results in maintaining uniform pressure to flow ratio. An elongated restricted passageway in the spool senses changes in viscosity in the fluid flowing through the device by reason of a corresponding pressure drop along the same which results in moving the spool and valve element to hold the flow through the device as desired.

The device is described in a hand paint spray gun wherein changes in pressure and viscosity of the paint flowing through the gun occur and the flow is held by the device as desired, thus, enabling the paint gun to maintain the desired pressure on the nozzle at all times regardless of changes in paint pressure or paint viscosity.

FIG. I

INVENTORS
FRANK WELTY &
BY RAYMOND D. WELTY

W. B. Hampman
ATTORNEY

INVENTORS
FRANK WELTY &
RAYMOND D. WELTY
BY
W. B. Harpman
ATTORNEY

PRESSURE VISCOSITY COMPENSATING FLOW CONTROL DEVICE

BACKGROUND OF THE INVENTION

1. Field of the Invention

This invention relates to pressure and viscosity compensating flow control devices such as used to maintain the desired flow of fluid regardless of changes in the source pressure and viscosity of the fluids being handled.

2. Description of the Prior Art

Prior structures of this type have utilized pressure control means consisting of valve elements biased by spring means and acting to move the valve element relative to a valve orifice upon increases or decreases of the pressure in the fluid being controlled. Such devices have had a common objection in being subject of a hunting action in which the valve element constantly moves seeking an intermediate position and actually over travelling with the result that an erratic pressure control results. Typical of such prior art are U.S. Pats. Nos. 3,155,111; 3,170,481; 2,888,949; 1,933,852; 3,112,764; 3,130,747; 2,255,787 and 2,984,261. No prior art is known with respect to the flexible diaphragm having the pressure drop orifice therethrough and directly supporting and moving a spool and valve element. Pats. 3,351,087 and 3,335,749 are the only prior art structures known utilizing differential pressures on the opposite sides of pistons and Pat. No. 3,335,749 discloses an elongated viscosity restrictor.

This invention incorporates means for introducing a solvent into the device to quickly clean paint or similar material therefrom.

SUMMARY OF THE INVENTION

A pressure viscosity compensating flow control device particularly suitable for use in a hand paint gun having a flexible diaphragm supporting a spool and valve element in a housing and arranged so that inlet source pressure of the paint is supplied to one side of the diaphragm so as to urge the spool and valve element in one direction and against a spring tensioning member to thereby tend to close the valve element relative to a valve seat in the housing and wherein the diaphragm incorporates a pressure drop orifice establishing communication to the other side thereof to create a differential pressure acting to oppose the adjustable spring tensioning unit in tending to move the spool and valve element away from the valve seat in the housing. The spool incorporating an elongated pressure drop restriction, so that it is responsive to changes in the viscosity of fluid and varies the position of the valve element which is responsive to such viscosity changes as well as pressure changes.

DESCRIPTION OF THE PREFERRED EMBODIMENT

Figure 3:
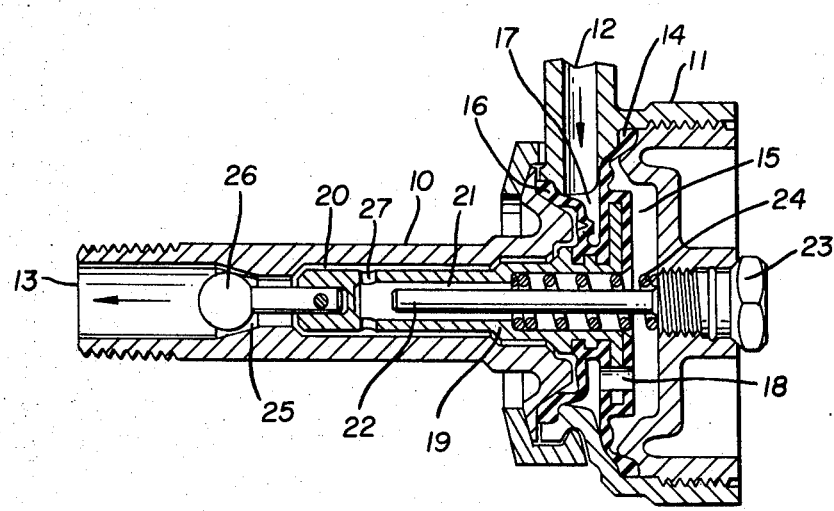
FIG. 3 is a cross sectional side elevation of the pressure-viscosity compensating flow control.

In its simplest form the pressure-viscosity compensating flow control may be seen in FIG. 3 of the drawings where it takes the form of a housing formed of parts 10 and 11 and defining an inlet opening 12 and an outlet opening 13.

A diaphragm 14 is positioned across a cavity 15 in the housing part 11 and the diaphragm itself includes a secondary portion 16 spaced with respect to the main diaphragm 14 and forming a diaphragm cavity 17 with which the inlet opening 12 communicates.

A pressure drop orifice 18 establishes communication between the cavity 17 and the cavity 15 in the housing portion 11.

The diaphragm 14 receives and supports a valve spool 19 which is positioned partially within the cavity 15 and partially within a longitudinal chamber 20 in the housing portion 10. The spool 19 is hollow throughout most of its length and defines a restricted passageway 21 by reason of a fixed rod 22 extending axially thereof and mounted on a plug 23 in an opening in the portion 11 of the housing. A compression spring 24 is positioned against the inner end of the plug 23 and against a shoulder in the spool 19.

A valve seat 25 is formed in the housing portion 10 and a valve element 26 on an extension of the spool 19 is registerable in the valve seat 26. The fluid passageway 21 extends through openings 27 in the spool 19 and continues around the extension supporting the valve element 26 and then through the valve seat 25 and the outlet opening 13.

It will thus be seen that fluid introduced into the device through the inlet opening 12 enters diaphragm cavity 17 and tends to move the diaphragm toward the cavity 15. It then flows through the pressure drop orifice 18 and into the cavity 15 where it creates a differential pressure against the other side of the diaphragm 14. It then flows through the passageway 21, the openings 27 and the elongated chamber 20 through the valve seat 25 and is thereby controlled by the valve element 26. If a pressure increase in the source of supply occurs, the pressure drop across the pressure drop orifice 18 would also increase causing the spool 19 to move against the spring 24 and partially close the valve seat 25 by movement of the valve element 26 thereby holding the flow to the outlet opening 13 constant. Conversely, a decrease in fluid pressure at the inlet orifice 12 would decrease the pressure drop across the pressure drop orifice 18 allowing the spring 24 to move the spool 19 to further open the valve element 26 with respect to the valve seat 25 to maintain the pressure at the outlet orifice 13 constant.

Should an increase in viscosity in the fluid flowing through the device occur do for example to a decrease in temperature or loss of solvent, the pressure drop across the long viscosity restrictor comprising the elongated passageway 21 would override the increased pressure drop across the pressure drop orifice 18 and allow the spring 24 to move the spool 19 to further open the valve element 26 with respect to the valve seat 25 thereby holding the flow to the outlet orifice 13 constant. Conversely, should the viscosity of the fluid flowing through the device decrease the pressure drop across the restrictor comprising the elongated passageway 21 would decrease thereby allowing the diaphragm 14 to move the spool 19 to partially close the valve seat 25 with the valve element 26 thereby continuing to hold the flow to the nozzle constant.

Figure 1:
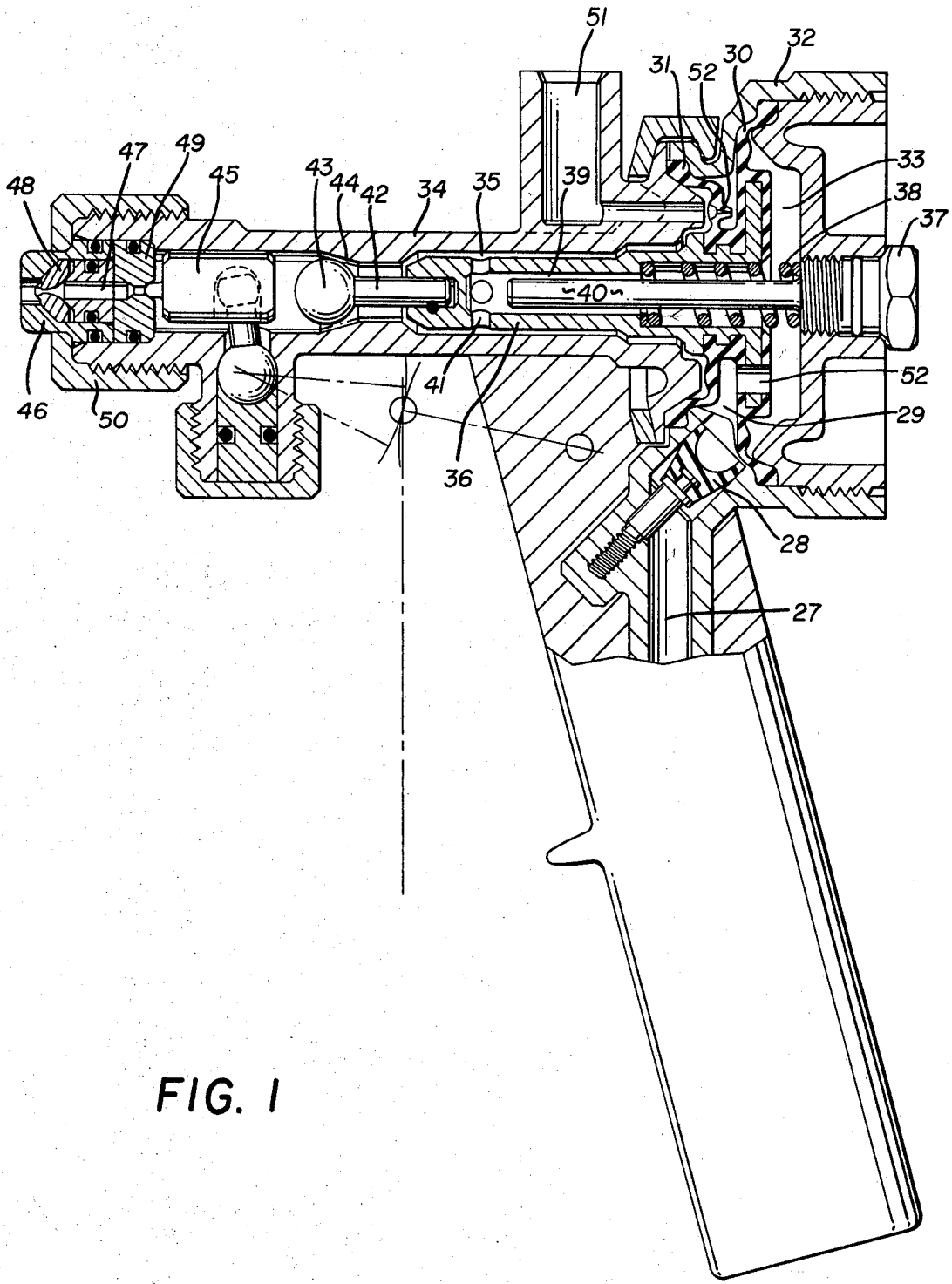
FIG. 1 is a cross sectional side elevation of a paint gun incorporating the pressure-viscosity compensating flow control device.

By referring now to FIG. 1 of the drawings, it will be seen that the pressure-viscosity compensating flow control just described in FIG. 3 has been incorporated in a hand paint gun wherein the inlet orifice 27 communicates by way of a check valve 28 with a diaphragm cavity 29 in a two-part diaphragm 30 and 31 respectively, the parts being spaced to create the diaphragm cavity 29 and positioned in a paint gun housing 32 which also defines a secondary cavity 33. The paint gun housing 32 has an extension 34 with an elongated chamber 35 therein in which a spool 36 is positioned and supported by the diaphragm 30 in the same manner as the spool 19 is supported by the diaphragm 14 is the embodiment of the the invention illustrated in FIG. 3 of the drawings and hereinbefore described. An adjustment plug 37 engages a tension spring 38 which in turn engages a shoulder on the spool 36 and within a hollow interior thereof which defines an elongated restrictor passageway 39 by reason of an elongated plug 40 extending there into and which plug 40 is an extension of the plug 37. Openings 41 communicate with a restrictor passageway 39 and the interior of the hollow extension 34 of the paint gun and convey liquid paint around the end of the spool 19 and an extension 42 thereon which carries a valve element 43 registerable with a valve seat 44 in the extension 34. A secondary valve 45 located in spaced relation to the valve element 43 and within the hollow extension 34 of the paint gun is movable to provide on and off control of the gun and particularly with respect to a paint spraying nozzle construction in a tip 46 of the paint gun. The nozzle includes a paint passageway 47 a nozzle orifice disc 48 and a control valve disc seat 49 with which the secondary valve element 45 registers. The nozzle assembly is held by a fitting 50 threadably engaged on the hollow extension 34 of the paint gun. The extension 34 of the paint gun has a secondary inlet port 51 which communicates with the outermost surface of the portion 31 of the diaphragm 30 and which portion is provided with at least one one-way integral valved opening 52 formed of the material of the diaphragm 30 and 31 and therefore resilient.

When a solvent source is placed in communication with the secondary inlet opening 51 and the paint supply source normally communicating with the inlet orifice 27 is disconnected the solvent will enter through the secondary inlet orifice 51 and flow against the outer surface of the diaphragm part 31 through the one way valve opening or openings 52 therein and into the diaphragm cavity 29 and then through the pressure drop orifice 52 and into the secondary cavity 33 from whence it will flow through the testrictor passageway 39, the openings 41 and through the hollow extension 34 and its paint carrying passageways to and including the spray nozzle tip 46. Thus, solvent may be introduced to quickly clean out the paint gun and permit another color of paint to be promptly handled thereby.

The operation of the paint gun with respect to the constant control of flow at varying pressures and viscosity by the compensating flow control built therein is exactly the same as that heretofore described in connection with the flow control device of FIG. 3 of the drawings and those skilled in the art will observe that paint flowing through the paint gun illustrated in FIG. 1 will be subjected to the pressure-viscosity compensating flow control so that a constant flow is maintained at the actual spray nozzle orifice at all times at varying supply pressures and varying paint viscosities. thereby preventing excessive over spray or under spring and assuring proper atomization of the paint at the nozzle.

Those skilled in the art will observe that while the embodiment illustrated and described as related to a hand paint gun, it is also applicable to a fixed paint spray nozzle assembly and, for example, a group of such fixed paint nozzles within a paint tunnel or the like.

Figure 2:
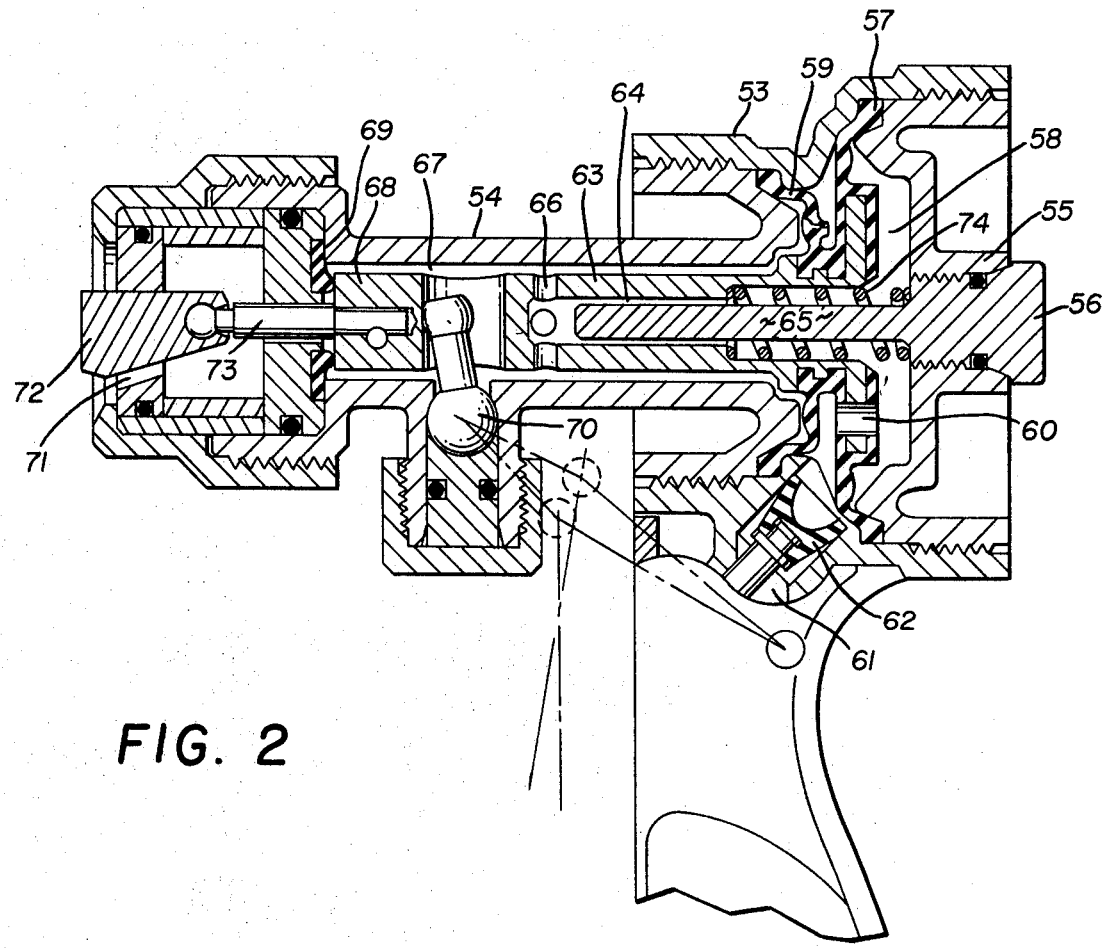
FIG. 2 is a cross sectional side elevation of a modified paint gun wherein the spool of the device is interconnected with a movable member in the tip of the paint gun so that the size of the spring orifice may be altered along with the flow and responsive to changes in source pressure and viscosity in the material flowing through the gun.

Those skilled in the art will observe that the compensating motion of the spool 19 of the device seen in FIG. 3 and the spool 36 of the hand paint gun seen in FIG. 1 may also be employed for varying the appropriate movable portions of a paint spray nozzle so as to vary the size of a spray orifice and by referring to FIG. 2 of the drawings, a modified hand paint spray gun may be seen incorporating such a modification.

In FIG. 2 the paint gun housing comprises the body member 53 and its extension portion 54. The portion 53 of the housing includes an end closure 55 with a plugged orifice in which a plug 56 is located and the diaphragm 57 is spaced inwardly with respect to the closure 55 and forms a diaphragm cavity 58. The diaphragm is a two part diaphragm with a second portion indicated by the numeral 59 and there is a pressure drop orifice 60 extending through the diaphragm so that paint introduced through an inlet 61 passing a check valve 62 is present at the upper or outer surface of the two part diaphragm 57 59. It will then flow through the pressure drop orifice 60 into the diaphragm cavity 58 and thence through the center opening of the diaphragm and into the hollow spool 63 by way of a restrictor passage 64 therein which is defined by an extension 65 on the plug 56.

Transverse passageways 66 convey the paint to the hollow interior 67 of the portion of the housing 54 where it can flow towards the nozzle assembly, It is first controlled by a valve element 68 on the spool 63 which is registerable with a valve seat 69 and a lever 70 is arranged so that this valve the numeral 68 can be manually moved to on or off position thereby.

When it is in on position, it will be observed that the valve 68 is capable of floating responsive to the pressure and viscosity control of the device as it is part of the spool 63. The nozzle assembly of the gun includes a paint discharging orifice 71 and a second valve element 72 movable therein and attached by way of an extension 73 to the forward end of the spool 63. Thus, motion of the spool 63 will be imparted to the secord valve element 72 which will thereupon vary the opening in the nozzle of the gun. The paint gun functions the same as the paint gun heretofore described in connection with FIG. 1 in that paint is introduced into the chamber between the two parts of the diaphragm 57 and 59, it flows through the pressure drop orifice 60 into the diaphragm cavity 58 thus a differential pressure is created thereon which is responsive to the pressure in the paint supply line. The spool 63 being attached to and movable by the diaphragm 57 is thus responsive to pressure fluctuations and opens and closes the second valve element 72 relative to the valve seat 71 to provide a uniform pressure and flow through the nozzle assembly. The paint passes through the hollow interior 67 around the rod 65 and thus moves through the restrictor passageway 64 which senses changes in viscosity and imparts movement relative thereto to the valve spool 64. The valve spool 64 in the modified structure of FIG. 2 of the drawings incorporates the biasing spring 74 and the function and operation of the pressure-viscosity compensating flow control device is the same in this environment as it is in the embodiment heretofore described in connection with FIG. 3 of the drawings.

In the modification of FIG. 2 the compensating motion of the valve spool not only acts in the manner hereinbefore described by permits the movement of the valve element 68 relative to the valve seat 69 in an on and off control as by control of the lever 70.

Although but a few embodiments of the present invention have been illustrated and described, it will be apparent to those skilled in the art that various changes and further modifications may be made therein without departing from the spirit of the invention.

We claim:

1. A pressure-viscosity compensating fluid flow control device consisting of a housing having inlet and outlet openings and a diaphragm chamber therein, a spaced pair of diaphragms in said chamber, a spool having thru-bore positioned in said chamber engaging central openings in said diaphragms, said inlet opening communicating with the space between said diaphragms, an orifice in one of said diaphragms to conduct fluid to the other side thereof to said thru-bore in said spool whereby fluid flowing through said orifice is conducted to the other end of said spool, an element on said other end of said valve spool for registry with a valve seat communicating with said outlet port and resiliently yieldable means biasing said spool against the axial force exerted by said diaphragms by reason of the pressure drop through said orifice.

2. The device of claim 1 and wherein the thru-bore is an elongated pressure drop passageway acting as a viscosity sensor.

3. The device of claim 1 and wherein the diaphragms are integral.

4. The device of claim 1 and wherein the valve element is positioned downstream of the valve seat.

5. The device of claim 1 having a secondary inlet opening communicating with the space between said diaphragms through which a second fluid may be directed for flushing said device.

6. A device of passing a predetermined quantity of fluid per unit of time regardless of variations in the pressure of the fluid source and variations in the viscosity of the fluid comprising: a housing having spaced inlet and outlet openings and a combined valve member and a diaphragm in said housing for controlling the flow of fluid between said inlet opening and said outlet opening, means to conduct fluid from the source to the side of the diaphragm which is toward the valve member to create a force on said diaphragm and to the other side of said diaphragm, to create an opposing force thereon, an orifice in said means conducting said fluid to the other side of said diaphragm, secondary means to conduct fluid from said other side of said diaphragm to said outlet opening by way of said valve member and yieldable means biasing said valve member and diaphragm against the axial force exerted by said diaphragm by reason of pressure drop through said orifice.

7. The device of claim 6 and wherein said means conducting said fluid to the other side of the diaphragm comprises an orifice through said diaphragm, said orifice acting to create said pressure drop.

8. The device of claim 7 and wherein said secondary means to conduct fluid from said other side of said diaphragm to said outlet opening comprises an elongated thru-bore in said valve member terminating short of the end thereof, and wherein said end of said valve member engages said outlet opening.

9. The device of claim 6 and wherein said diaphragm is double with a space therebetween and said means conducting fluid from said source communicates with said space.